Jan. 5, 1932.    A. D. PENTZ    1,839,338
HOSE COUPLING
Filed Oct. 4, 1927
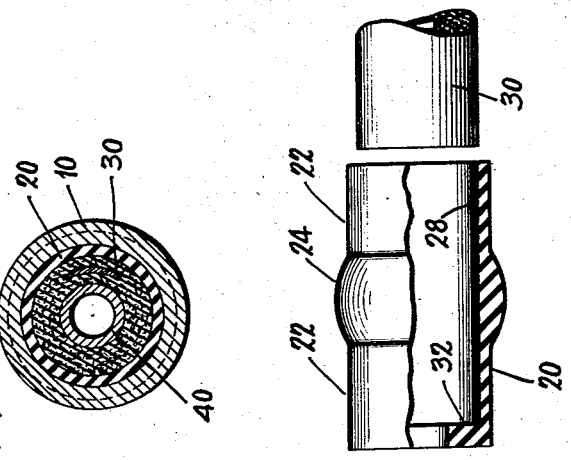
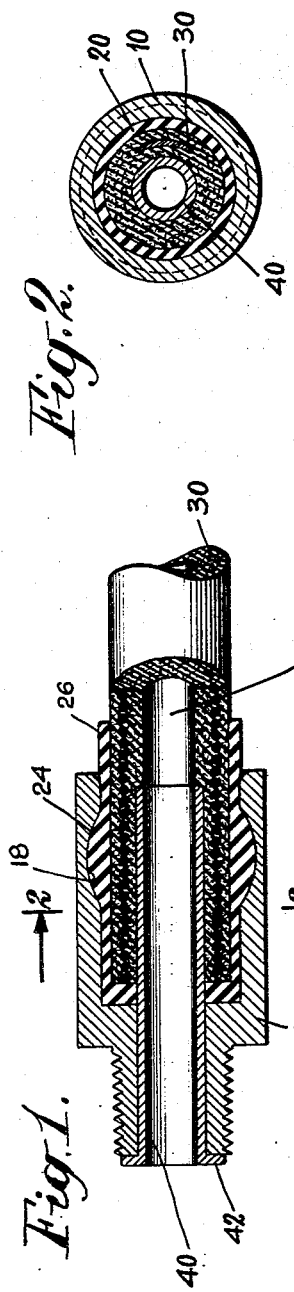
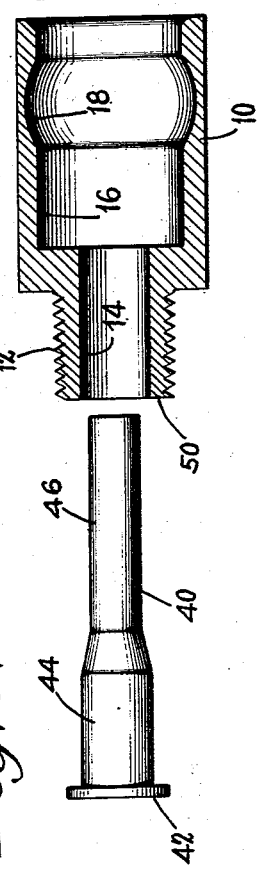
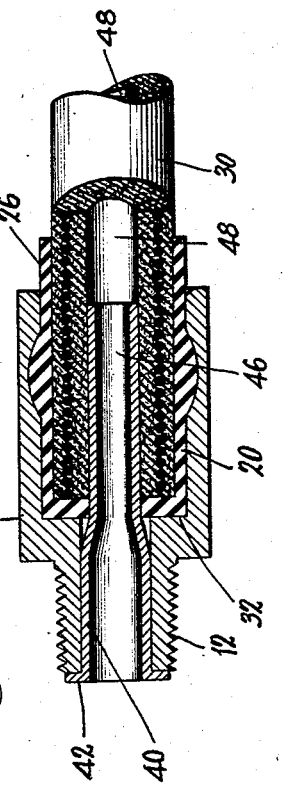
Inventor
A. D. Pentz
By his Attorneys
Cooper, Kerr & Dunham Patented Jan. 5, 1932

1,839,338

UNITED STATES PATENT OFFICE

ALBERT D. PENTZ, OF NEW YORK, N. Y., ASSIGNOR TO PENTZ MOTOR BRAKE CORPORATION, OF NEW YORK, N. Y., A CORPORATION OF NEW YORK

HOSE COUPLING

Application filed October 4, 1927. Serial No. 223,875.

This invention pertains to hose couplings, and has for its principal object the provision of a coupling suitable for hydraulic brake systems of automobiles.

In such service the pressures are comparatively high and the service is severe. Vibration is ever present, together with almost continual bending or flexing of the hose.

It is necessary for brake service that the stretching of hose and couplings be prevented as completely as possible in order to allow the full displacement of the brake plunger to be applied toward the moving of brake shoes instead of part of the displacement being used for expanding the hose and fittings.

The object of the present invention, therefore, is to provide a hose coupling particularly adapted for hydraulic brake service, which is easily assembled, non-expansible after assembly, durable in service, and cheap to manufacture.

Further and other objects and advantages will be hereinafter set forth in the accompanying specification and claims, and shown in the drawings, which by way of illustration show what is now considered to be the preferred embodiment of the invention.

Fig. 1 is a cross-section of the coupling assembled on the hose.

Fig. 2 is a cross-section on the line 2—2 of Fig. 1.

Fig. 3 is an exploded view of the various parts of the coupling before assembly.

Fig. 4 is a cross-section of the coupling in an intermediate stage of the assembly operation.

The coupling comprises an outer shell 10 preferably of steel. One end of the shell is of reduced diameter and externally threaded as at 12. This end is bored as at 14. The other end of the shell is bored cylindrically as at 16, and counter-bored midway of its interior length as at 18.

A rubber sleeve or "slip-on" 20 is provided, having an outer cylindrical surface 22 to fit snugly within the surface 16 of shell 10, and a swelled exterior portion 24 to fit within the counter-bore 18 when the rubber sleeve is placed within shell 10 as in Fig. 4. Sleeve 20 is of sufficient length to project beyond the end of shell 10 to form a skirt as at 26. The interior of sleeve 20 is a cylindrical surface 28 of proper diameter to receive hose 30. One end of sleeve 20 is closed by a thickened head 32, through the center of which a circular opening or bore is provided to accommodate ferrule 40. The ferrule has a flange 42, a portion 44 of large diameter, and a reduced portion 46 of proper diameter to readily enter the bore 48 of the hose. The ferrule is made of ductile material such as copper, and its wall is of substantially uniform thickness throughout.

To assemble the coupling, slip-on 20 is placed in the large end of shell 10, the end of hose 30 is inserted in slip-on 20, and from the threaded end of the shell ferrule 40 is inserted into shell and hose as shown in Fig. 4. In order to complete the assembly an expanding tool is inserted in the reduced diameter of the ferrule and is operated to expand the reduced portion until the ferrule is of substantially the same diameter throughout as the enlarged diameter 44 (Fig. 1).

This operation compresses sleeve 20 and hose 30 radially outwardly, with the result that the parts become so closely inter-engaged as to be impossible of disassembly without wrecking the structure.

In former practice, after expansion of the ferrule, hose 30 engaged recesses or corrugations in shell 10, with the result that the outer fabric of the hose was cut or damaged. In the present invention both inner and outer surfaces of the hose are left unchanged. The inner surface is in contact with the ferrule and the outer surface is surrounded by sleeve 20.

If tension be applied to draw the hose out of the coupling shell, separation is resisted by the close cohesive contact of the rubber hose and rubber slip-on. Separation of the shell and slip-on is prevented by the engagement of the swelled portion 24 of the slip-on with counter-bore 18 of the shell. Thus is close, inseparable engagement provided between shell and hose without in any way doing injury to the hose.

Skirt 26 of slip-on 20 performs the additional important function of protecting the hose against injury due to flexing around the outer edge of bore 16, thereby adding to the useful life of the hose.

Flange 42 on the end of the ferrule serves as a gasket to prevent leakage at that point when the coupling is screwed into another fitting. When ferrule 40 is expanded within the rubber slip-on head 32, a tight joint is provided at that point to prevent leakage lengthwise of the outside of the ferrule.

It is to be understood that the invention is not limited to the construction herein specifically illustrated but can be embodied in other forms without departure from its spirit as defined by the following claim.

I claim—

A hose coupling comprising in combination, a non-expansible shell, a resilient sleeve within the shell and surrounding the end of the hose; and a ductile ferrule expanded within the hose to compress said sleeve and said hose between said ferrule and said shell, said shell being counter-bored and said sleeve having a pre-formed swelled portion to engage the counter-bore of said shell to resist endwise withdrawal of said sleeve from said shell.

In testimony whereof I hereto affix my signature.

ALBERT D. PENTZ.